March 24, 1931.   P. M. COOK   1,797,898
SANDING APPARATUS
Filed April 18, 1930
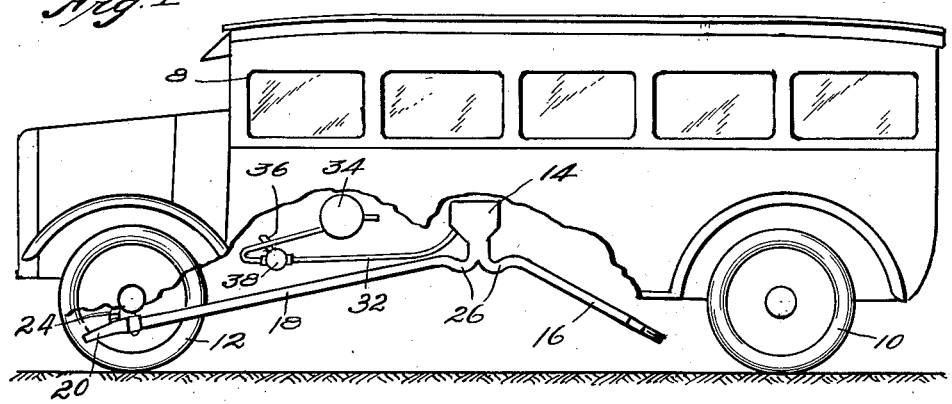
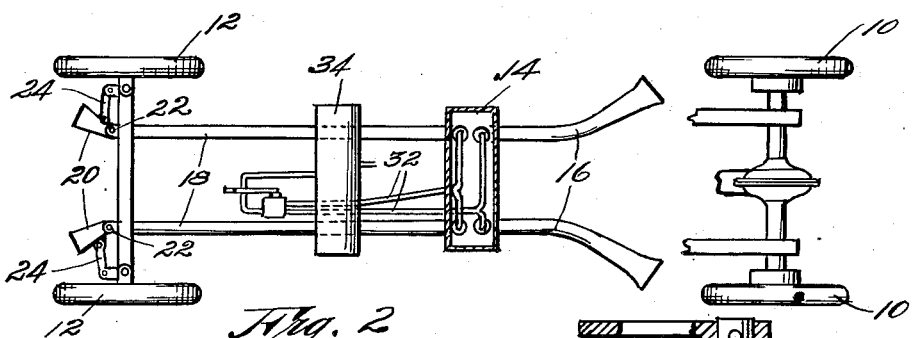
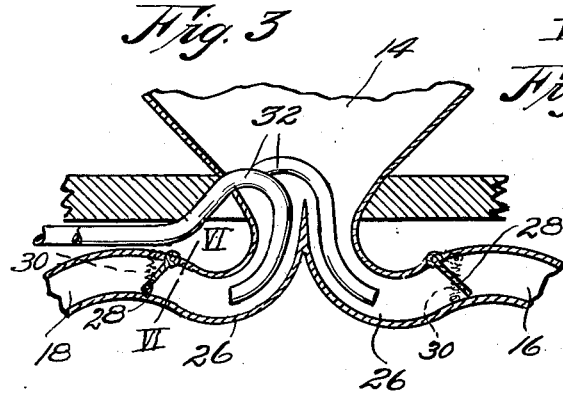
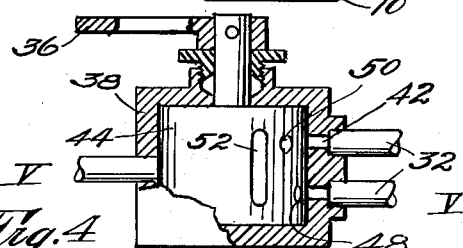
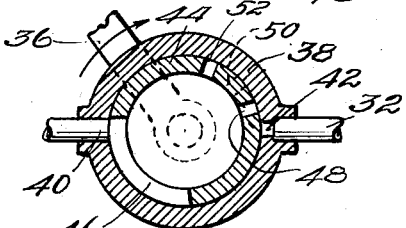
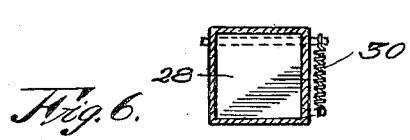
INVENTOR,
Percy M. Cook.
BY Hovey & Hamilton
ATTORNEYS.

Patented Mar. 24, 1931

1,797,898

UNITED STATES PATENT OFFICE

PERCY M. COOK, OF KANSAS CITY, KANSAS

SANDING APPARATUS

Application filed April 18, 1930. Serial No. 445,310.

This invention relates to sanding apparatus especially adapted for use in connection with automobiles and has for its primary object the provision of efficient means for spreading sand or a similar abrasive beneath the wheels of the vehicle through which braking power is exerted.

Another object of this invention is the provision of sanding apparatus for automobiles of the four wheel brake type which includes means for spreading sand or anti-skidding material beneath all of the wheels of the vehicle; the sand conduits supplying the guide wheels of the vehicle being provided with a section movable with the guide wheels as the same are turned to alter the direction of travel of the automobile.

A still further object of the present invention is to provide sanding apparatus for automobiles which includes novel and simple means for providing a supply of sand to be forced beneath the wheels at the end of the air ducts through which air under pressure is forced to move the sand through the conduits leading to each wheel of the vehicle.

An even further object of this invention is to provide a novel sand reservoir and conduits extending therefrom to each of the vehicle wheels which are formed in such a manner that sand from the reservoir will be fed by gravity to a trap portion of each conduit where it is held immediately adjacent the end of air ducts whereby as soon as the air is caused to pass through the ducts, sand will be available to be mixed therewith for passage through the conduit.

A yet further object of the present invention is the provision of simple effective means in the form of a valve or the like for selectively causing sand to be spread beneath either the two front wheels, the two back wheels, or all of the wheels of the vehicle, simultaneously.

Many minor objects of this invention pertaining to sanding devices will appear during the course of the detailed specification referring to the accompanying drawing wherein the preferred form of the invention is shown.

In the drawing:

Figure 1 is a side elevation of an automobile equipped with a sanding device made in accordance with this invention, parts being broken away for clearness.

Fig. 2 is a top plan view of a chassis of an automobile showing in a diagrammatical manner the construction and attachment of the sanding device.

Fig. 3 is an enlarged fragmentary sectional view of a portion of the sand reservoir and the conduits and air ducts used in removing sand therefrom.

Fig. 4 is an enlarged fragmentary sectional view of the air valve interposed in the air line and used for selectively spreading sand beneath the wheels of the vehicle.

Fig. 5 is a vertical cross section of the valve taken on line V—V of Fig. 4, and Fig. 6 is a section taken along line VI—VI of Fig. 3 showing the gate construction.

Like reference characters refer to similar parts throughout the several views of the drawing and the numeral 8 indicates an automobile which may be of any style or make having a set of back wheels 10 and a pair of front wheels 12. Since the various parts of this sanding apparatus might be supported by any of the parts of the automobile, specific reference to the method of attachment will not herein be made. The apparatus itself should have a reservoir 14 for holding sand or other abrasive material which is spread beneath the wheels of the vehicle to keep the same from skidding. Since it is desirable to spread sand beneath all four wheels of the automobile 8, it is desirable to have conduits 16 extending from reservoir 14 to points adjacent the two back wheels 10 as shown in Fig. 2. Likewise, conduits 18 should pass from reservoir 14 to points forwardly of the front wheels 12. Since it is desirable to spread sand or similar abrasive material beneath the forward wheels when the vehicle is being guided to alter its path of travel, conduits 18 are provided at their ends adjacent front wheels 12 with a movable section 20 which may be pivoted as at 22 to conduit 18 in such a manner as to allow the movable section to be always directed to a point immediately in front of the adjacent wheel 12 while the same is being moved by the well known steering mechanism of the automobile 8. To carry out this desirable function, connecting apparatus 24 in the form of a link or the like should join the movable section 20 with a movable part of the wheel 12.

When apparatus of this character is brought into play, an emergency is usually at hand and it is desired to have the parts of the mechanism constructed in such a manner that sand will be carried beneath the wheels as soon as the air is turned on. Accordingly, conduits 16 and 18 leading to back and front wheels respectively are formed adjacent and below reservoir 14 to provide a trap 26 within which is pivotally mounted a gate 28 which divides trap 26 from the rest of the conduit. This gate 28 is held in the closed position by a spring or other yieldable means 30 which is strong enough to hold the gate 28 closed against the sand which always fills trap 26. The sand flows into trap 26 from reservoir 14 by gravity and to move the same from trap 26 though the conduits 16 or 18, as the case may be, joining the trap 26, air ducts 32 are provided which terminate within trap 26 and at a point spaced apart from gate 28, thus a cavity is formed which is always filled with sand and the first blast of air from the end of conduit 32 will carry the sand filling this cavity ahead of it out through the joining conduit to a place beneath the automobile wheel.

Air ducts 32 should be two in number and they should be caused to branch within reservoir 14 as shown in Fig. 2. Air under pressure, is supplied to ducts 32 from the tank 34 which in turn may be supplied from a pump or other suitable source not here shown.

To selectively cause air to pass through one or the other of the ducts 32, a valve should be interposed in the air line which has a manually operable lever arm 36 which is actuated by the driver of the car when it is desired to cause sand to be spread beneath the wheels of the automobile 8.

This valve may be constructed by providing a housing 38 having an inlet port 40 and a pair of outlet ports 42 which communicate with air ducts 32. Housing 38 should have a hollow cylindrical opening formed therein which receives the rotor 44 which is actuated by lever 36. Through the location and shape of the various openings through the wall of rotor 44, air is selectively caused to pass through either one or the other of air ducts 32 or through both of said ducts 32 simultaneously. Port 40, through which passes compressed air from tank 34, communicates with the elongated port 46 at all times in order that air under pressure might always be within the hollow rotor 44. When it is desired to cause air to pass through duct 32 to cause sand to be spread beneath rear wheels 10, lever 36 is moved in the direction of the arrow shown in Fig. 5, to cause rotor 44 to take a position where hole 48 passing through the wall thereof, will register with air duct 32 supplying air to conduit 16. A further movement of lever 36 will move rotor 44 to a point where opening 50 through the wall of rotor 44 will register with air duct 32 supplying air to the conduits 18. This movement obviously, shuts off the air supplying the rear conduits 16 and causes air and sand to pass through the forward conduits 18. If it is desired to cause sand to be thrown beneath all four wheels of the vehicle, a further movement of lever 36 will cause slot 52 formed through the wall of rotor 44, to register with both outlet ports 42, thus an uninterrupted passage of air is set up between tank 34 and both air ducts 32 which will cause sand to be forced beneath all four wheels of automobile 8. Obviously, elongated port 46 will always establish communication between inlet port 40 and the hollow rotor 44.

The operation of the device has been made clear throughout the specification, and while the preferred form of embodiment has been illustrated and described, it is desired to be limited only by the scope of the appended claims.

What is claimed and desired to be secured by Letters Patent is:

1. A sanding apparatus for automobiles comprising a sand reservoir, a conduit extending from said reservoir to each wheel respectively of the automobile, a trap formed by each conduit adjacent the reservoir whereby sand may settle by gravity therein, and an air duct terminating in the trap of each conduit.

2. A sanding apparatus for automobiles comprising a reservoir, a conduit extending from said reservoir to each wheel respectively of the automobile, a trap formed by each conduit below the reservoir, a gate closing one end of each trap respectively whereby sand may settle by gravity and be held therein, and an air duct terminating in each trap.

3. A sanding apparatus for automobiles comprising a reservoir, a conduit extending from said reservoir to each wheel respectively of the automobile, a trap formed by each conduit below the reservoir, a gate closing one end of each trap respectively whereby sand may settle by gravity and be held therein, and an air duct terminating in each trap, the end of said duct being spaced from the gate to insure a supply of sand between said air duct and gate for passage through said gate immediately upon the issuance of air from said duct.

4. A sanding apparatus for automobiles comprising a reservoir, a conduit extending from said reservoir to each wheel respectively of the automobile, a trap formed by each conduit for receiving by gravity a supply of sand from said reservoir, air ducts terminating in said conduits, a gate closing one end of each trap formed by said conduits, and means yieldably maintaining said gate in the closed position against the outward pressure of sand collected in said trap.

5. A sanding apparatus for automobiles comprising a reservoir, a conduit extending from said reservoir to each wheel respectively of the automobile, a trap formed by each conduit for receiving by gravity a supply of sand from said reservoir, air ducts terminating in said conduits, a gate closing one end of each trap formed by said conduits, means yieldably maintaining said gate in the closed position against the outward pressure of sand collected in said trap, said yieldable means being stronger than the sand pressure against said gate and weaker than the combined air and sand pressure whereby when air is forced into the trap, through the conduit, the gate immediately opens to allow sand and air to pass therethrough.

6. A sanding apparatus for automobiles comprising a reservoir, a conduit extending from said reservoir to each wheel respectively of the automobile, a trap formed by each conduit for receiving by gravity a supply of sand from said reservoir, air ducts terminating in said conduits, a gate closing one end of each trap formed by said conduits, and means yieldably maintaining said gate in the closed position against the outward pressure of sand collected in said trap, and manually operable means interposed in the air line for selectively causing sand to be spread under either the front wheels, the back wheels, or all four wheels simultaneously.

7. A sanding apparatus for automobiles comprising a reservoir, a conduit extending from said reservoir to each wheel respectively of the automobile, means for forcing sand through the conduit and a movable section carried at the end of the conduits leading to the front wheels and apparatus connecting said movable section with the movable part of the adjacent front wheel whereby said section is moved as the wheels are moved.

In testimony whereof, I hereunto affix my signature.

PERCY M. COOK.